United States Patent [19]

Bricmont

[11] Patent Number: 4,673,431

[45] Date of Patent: Jun. 16, 1987

[54] FURNACE DUST RECOVERY PROCESS

[75] Inventor: Francis H. Bricmont, Pittsburgh, Pa.

[73] Assignee: Bricmont & Associates, Inc., McMurray, Pa.

[21] Appl. No.: 817,063

[22] Filed: Jan. 8, 1986

[51] Int. Cl.$^4$ ............................................. C22B 7/02
[52] U.S. Cl. ........................................ 75/25; 75/66; 75/71; 75/77; 75/78; 423/97; 423/200
[58] Field of Search .................... 75/25, 3, 14, 88, 71, 75/77, 10.3, 10.29, 10.32; 423/97, 10.31

[56] References Cited

U.S. PATENT DOCUMENTS 4,119,455 10/1978 Cass et al. ............................... 75/25
4,396,423 8/1983 Stephens, Jr. et al. .................. 75/25

FOREIGN PATENT DOCUMENTS 2752118 6/1979 Fed. Rep. of Germany .......... 75/25
120633 7/1982 Japan ..................................... 423/97
147528 9/1983 Japan ..................................... 75/25

OTHER PUBLICATIONS

No. 120633, 7/1982, Japanese Patent USPTO, English Translation, PTO 3727, Dec. 1986.

Primary Examiner—Melvyn J. Andrews
Attorney, Agent, or Firm—Thomas H. Murray; Clifford A. Poff

[57] ABSTRACT

A process for selective vaporization of oxides from recovered waste dust collected from a bag house. Pellets are formed from the waste dust and dried to permit charging in an oxidizing chamber wherein an oxidizing atmospheric is maintained. The chamber is heated to a temperature sufficient to vaporize lead oxide and, if present, also oxides of cadmium, potassium and sodium. The vapors are cooled and separated from furnace gas. The residual oxidized mass is cooled after removal from the oxidizing chamber and fed into a reduction chamber wherein a reducing atmosphere is maintained. The reduction chamber is heated to a temperature of between 1800 and 2000 degrees Fahrenheit to reduce zinc oxide and form zinc vapors which are cooled and separated from furnace gas. Lead oxide particles recovered from the oxidizing process are reduced to lead.

22 Claims, 1 Drawing Figure

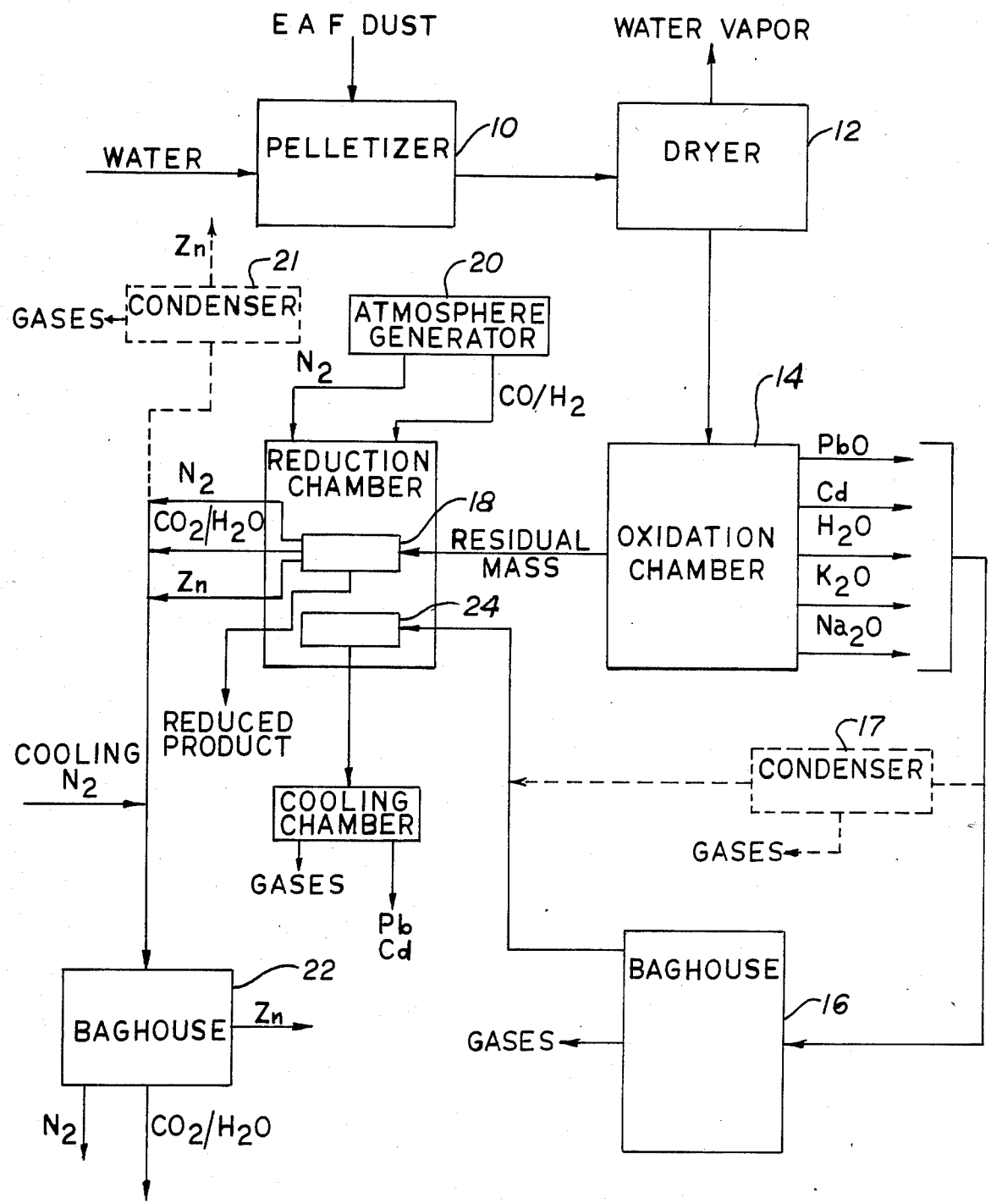

FURNACE DUST RECOVERY PROCESS

BACKGROUND OF THE INVENTION

This invention relates to a process for removing one or more toxic oxides forming undesirable contaminants in recovered waste dust and more particularly, to the removal of lead oxide and, when present, cadmium oxide and, when desired, zinc oxide by vaporization. The vaporization is essentially carried out in the oxidizing atmosphere at least at the vaporization temperature of lead oxide and, additional vaporization may be carried out in a reducing atmosphere at least at the vaporization temperature of zinc.

Melting or refining processes generate substantial quantities of dust which must be collected to prevent environmental pollution. Steel-making furnaces for example, liberate airborne particles which are typically collected by directing gases containing the particles to a filter situated in a bag house. Such steel-making facilities include an electric arc furnace, basic oxygen furnace, and an open hearth. While not so limited, the present invention is particularly useful to treat waste dust recovered from an electric arc steel-making facility in which it was a conventional practice to collect, filter, and dispose of all airborne particles as, for example, in a land fill operation. Such disposal is environmentally unacceptable because the waste dust contains leachable metal oxides of lead, cadmium, and chromium. It is an unnecessary economic burden on the steel-making process to dispose of the waste dust as a hazardous waste.

It is known in the art to pelletize steel-making dust and then heat the pellets in a reducing atmosphere to recover zinc by vaporization as disclosed in U.S. Pat. Nos. 3,756,804; 3,770,416; 4,266,966; 4,283,223; 4,396,423; 4,404,027; 4,434,001; and 4,488,905. The reduction process, however, cannot be utilized to remove lead and cadmium oxides which, if allowed to remain in the recovered mass from the reduction process, render the mass a hazardous material and importantly, prohibit recycling of the mass as a part of a furnace charge.

SUMMARY OF THE INVENTION

It is an object of the present invention to provide a process for treating waste dust recovered from a melting or refining process to remove lead oxide and, when present, to remove cadmium oxide and to stabilize chromium oxide to permit handling of the of the residual mass as a non-toxic waste.

It is a further object of the present invention to provide a process for treating waste dust recovered from a melting or refining process, to remove lead oxide and, when present, to remove cadmium and zinc oxides and to stabilize chromium oxide to permit handling of the residual mass as a non-toxic waste, but importantly, to permit use of the residual mass as part of a furnace charge.

It is a further object of the present invention to provide a process for treating waste dust recovered from melting or refining process such as a steel-making furnace by the vaporization of a constituent oxide of lead and recovery of the vapors in a form which is easily handled, thus, economically beneficial to the process while the residual mass can be treated to remove zinc oxide.

More particularly according to the present invention, there is provided a process for removing toxic lead oxide and, when present, cadmium oxide forming leachable contaminants in waste dust recovered from a melting or refining operation, the process including the steps of pelletizing the waste dust, heating the pelletized waste dust in an oxidizing atmosphere to a temperature sufficient to essentially form lead oxide vapors, separating the vapors from the oxidized residual mass, causing the vapors to solidify, and recovering the solidified vapors.

In the preferred form, the process of the present invention provides for treating the oxidized residual mass which is laden with zinc oxide by heating the oxidized residual mass in a reducing atmosphere to a temperature sufficient to reduce the zinc oxide and form zinc vapors, separating the zinc vapors from the reduced residual mass, recovering solidified zinc vapors and recovering the reduced residual mass which mainly comprises iron oxide.

Heating of the pelletized waste dust is carried out preferably at a temperature of about 2700 degrees Fahrenheit and preferably not greater than 2800 degrees Fahrenheit. The heating of the oxidized residual mass in a reducing atmosphere is preferably carried out at a temperature of about 1800 degrees Fahrenheit, but usually not greater than 2000 degrees Fahrenheit. Lead oxide and cadmium, when present, may be treated in a reducing atmosphere to form a liquid mixture of lead and cadmium which is nontoxic.

These features and advantages of the present invention as well as others will be more fully understood when the following description is read in light of the accompanying drawing.

BRIEF DESCRIPTION OF THE DRAWING

The drawing schematically illustrates a preferred arrangement of apparatus to carry out the process of the present invention.

The process of the present invention is useful for treating dust recovered from any of known melting or refining process in which the recovered dust contains a toxic contaminant comprising oxides of lead, cadmium and chromium and typically also includes zinc oxide. The process of the present invention is particularly useful for treating dust recovered from an electric arc furnace, because, typically, such furnaces are charged with substantial quantities of scrap metal. The composition of the electric arc furnace dust will vary from furnace to furnace dependent on the type and quantity of the scrap charge and the final product analysis. A stainless steel producer using an electric furnace would experience relatively larger amounts of chromium and nickel oxides in the waste dust whereas the amount of zinc oxide will vary with the amount of galvanized and automotive scrap. The increased use of galvanized material in automotive fabrication will increase the amount of recoverable zinc when the derived scrap is recycled. A typical composition of particulate generated by an electric arc furnace producing carbion steel is given in table 1.

TABLE 1

| COMPONENT | WEIGHT % |
|---|---|
| Iron Oxide ($Fe_2O_3$) | 61.96% |
| Cadmium Oxide (CdO) | 0.01% |
| Lead Oxide (PbO) | 0.89% |
| Zinc Oxide (ZnO) | 3.01% |
| Chromium Oxide ($Cr_2O_3$) | 1.62% |
| Calcium Oxide (CaO) | 13.36% |
| Silicon Oxide ($SiO_2$) | 4.55% |
| Magnesium Oxide (MgO) | 5.61% |

TABLE 1-continued

| COMPONENT | WEIGHT % |
| --- | --- |
| Manganese Oxide (MnO) | 5.42% |
| Molybdenous Oxide (MoO₃) | 0.71% |
| Copper Oxide (CuO) | 0.18% |
| Nickel Oxide (NiO) | 0.051% |
| Sodium Oxide (Na₂O) | 1.81% |
| Potassium Oxide (K₂O) | 0.53% |
| Trace elements | remainder |

The present invention is concerned with the treatment of waste dust for the removal of oxides which may be considered toxic oxides and essentially include lead and, if present, also cadmium and, if desired, zinc oxide although not considered toxic. Eventually, a vaporization process is carried out in an oxidizing atmosphere at a temperature sufficient to vaporize lead oxide. The melting and vaporization temperatures of lead and lead oxide as well as typical other constituent in waste furnace dust are given in table 2 below:

TABLE 2

MELTING AND VAPORIZATION POINT OF VARIOUS COMPONENTS OF ELECTRIC ARC FURNACE DUST

| COMPONENT | | MELTING TEMPERATURE (°F.) | VAPORIZATION TEMPERATURE (°F.) |
| --- | --- | --- | --- |
| Lead | Oxide | 1625 | 2687 |
| | Metal | 618 | 3137 |
| Zinc | Oxide | 3587 | +4000 |
| | Metal | 788 | 1670 |
| Cadmium | Oxide | 1652 | Decomposes |
| | Metal | 610 | 1409 |
| Iron | Oxide | 2849 | +4000 |
| | Metal | 2802 | 5432 |
| Calcium | Oxide | 4676 | 5162 |
| | Metal | 1540 | 2625 |
| Potassium | Oxide | 662 | Decomposes |
| | Metal | 147 | 1400 |
| Sodium | Oxide | sublimes | 2327 |
| | Metal | 208 | 1590 |
| Magnesium | Oxide | 5072 | 6512 |
| | Metal | 1202 | 2012 |
| Manganese | Oxide | 2273 | 3900 |
| | Metal | 3227 | +4000 |
| Silicon | Oxide | 3115 | 4046 |
| | Metal | 2570 | 4496 |
| Chromium | Oxide | 3380 | 4824 |
| | Metal | 4415 | 7232 |

The embodiment of the process illustrated in the drawing is especially useful for treating electric arc furnace dust which is collected in the bag house. The particles of waste dust present difficult handling problems because the particles are relatively small, usually about 2.5 microns, and have a settling velocity less than $10^{-5}$ feet per second. The dust is loaded into a pelletizer 10 together with water sufficient to form a pug from which pellets are formed having a size preferably between $\frac{1}{4}$ to $\frac{3}{4}$ inch diameter. The pellets emerging from the pelletizer typically have a moisture content of about 5 to 10 percent which is reduced by feeding the pellets into a dryer 12 to increase the porosity and strength of the pellets. The dust pellets can now be loaded into a feed bin for delivery into an oxidizing chamber 14 in a batch-like, but preferably, continuous fashion. Preferably, the oxidation chamber takes the form of a furnace having an elongated oxidizing chamber in which the waste dust pellets are introduced at one end and proceed along the chamber floor to a discharge outlet. An oxidizing atmosphere is maintained in the oxidizing chamber, preferably by feeding atmospheric air and/or oxygen into the chamber. The chamber is heated as by the use of fossil fuel or electric power to a temperature sufficient to vaporize the lead oxide constituent from the pelletized waste dust. This temperature must be at least 2687 degrees Fahrenheit, preferably, however, the oxidation chamber is operated at a temperature of about 2700 degrees but usually not greater than 2800 degrees. In this temperature range and under oxidizing conditions in the chamber, any cadmium oxide present in the pelletized waste dust decomposes and vaporizes. The vapors of lead oxide and cadmium metal are drawn from the oxidation chamber with flue gas and delivered by a suitable conduit to a bag house 16 where the flue gases are separated from solidified particles of the vapors of lead oxide and cadmium present therein. Solidification of the lead oxide and cadmium occurs as the flue gas stream undergoes cooling while conducted by a conduit to the bag house. Also, under the operating conditions in the oxidizing chamber, sodium oxide and potassium will be vaporized when the oxides are present in the pelletized waste dust. These oxides also solidify as the flue gas stream cools and the particles are collected in the bag house. Devices other than a bag house, such as a cooling condenser 17, can be used to separate lead oxide and cadmium from the flue gases.

The residual material remaining in the furnace is withdrawn through an opening as a fluid or sinter mass which is partially cooled or quenched. Rapid quenching of the mass produces a granular feed which can be conveyed while at an elevated temperature to a reduction chamber 18. The reduction chamber is preferably formed by an elongated furnace in which feed materials are introduced at one end and transported to a discharge port at the opposite end of the furnace. A reducing atmosphere is maintained in the furnace by the introduction of nitrogen and carbon monoxide and/or hydrogen gas from an atmospheric generator 20. The reducing chamber is maintained at a temperature of about 1800 degrees and preferably not greater than 2000 degrees. Carbon monoxide and hydrogen in the reducing atmosphere form reducing gases which react with zinc oxide present in the charge of granular material to form zinc which vaporizes. The zinc vapors are drawn off with flue gases from the reduction chamber for delivery by a conduit to which there is preferably introduced an inert coolant such as nitrogen or argon gas to solidify the zinc vapor for separation in a bag house 22. Also, delivered with the flue gas from the reduction chamber are nitrogen gas and carbon dioxide/water vapor. As shown in the drawing, zinc is recovered in the bag house as well as the nitrogen gas and carbon dioxide/water vapor. Again, devices other than a bag house such as a cooling condenser 21 can be used to separate zinc from the furnace gases.

The residue from the reducing operation in the reduction chamber is discharged through the outlet opening. The residual material is mainly comprised of iron oxide which can be formed into briquettes, cooled and used to recharge the steel-making furnace. Carbonious material, such as coke, can be added to the reduction chamber or mixed with the reduced product therefrom to enhance the use of the briquettes as a charge material in a steel-making furnace. The removal of lead oxide from the waste dust is important not only because lead oxide is leachable and a hazard constituent in waste material but also lead is detrimental to the steel-making process because lead does not alloy with iron. As a result, if lead is present in the charge material for an electric arc furnace, it will build up in the furnace causing operational problems. As can be seen from table 2, metallic lead vaporizes at a temperature of 3137 degrees Fahrenheit whereas lead oxide vaporizes at a much lower temperature of 2689 degrees Fahrenheit. It is more feasible in terms of energy and refractory requirements to vaporize lead oxide rather than reduce the oxide to metal. The oxidizing atmosphere in the chamber vaporizes lead oxide without reduction of even trace amounts to lead. Operation of the oxidation chamber at a temperature of 2700 degrees is preferable because it is above the vaporization temperature of lead oxide but below the temperature range where iron oxide looses stability.

The present invention thus insures complete removal of lead which might otherwise constitute a hazardous material in the waste dust. Some lead may be alloyed with zinc which can be removed during the reduction process with zinc at a lower temperature. Elemental lead, however, cannot be removed in this manner. A surprising discovery arising out of the process of the present invention is an enhancement of any chromium oxide present in the waste dust. Although not completely understood, it has been discovered that when chromium oxide is present in the waste dust, the chromium oxide is not leachable from the iron oxide residue. It is believed that the chromium oxide in the waste dust undergoes some type of transformation into a more stable form, such as chromic oxide $Cr_2O_3$ which is non-leachable. However, chromium and its oxides are economically beneficial to electric arc steel making and enhance the economics arising out of the use of the residual material from the process of the present invention as a charge material for an electric arc furnace. As can be seen from table 2, the vaporization temperatures of the metal and oxide are higher than the melting point of iron oxide matrix whereby it is difficult to carry out a separation process in a solid state. The particulate which is collected in the bag house 16 from the oxidation chamber will contan large quantities of lead oxide.

Referring again to the drawing, the solid residue which is collected in bag house 16 or oxide and metal condensate from condenser 17 is preferably treated to reduce the lead oxide constituent to lead thereby avoiding a need to dispose of lead oxide as a toxide waste in the residue. For this purose, the solid residue is fed into a reducing chamber 24 which is separate and apart from the reducing chambef 18 which receives the residual mass from the oxidizing chamber. The reducing chambers 18 and 24 are preferably situated within the same furnace to carry out reducing operations at the same temperature which is maintained in the furnace. This temperature, as previously described, is preferably between 1800 degrees and 2000 degrees Fahrenheit. Into chamber 24, there is also introduced reducing gases of nitrogen and carbon monoxide/hydrogen. Under these conditions in reducing chamber 24, lead oxide present in the charge material is reduced to lead which can be drawn off from the chamber as a mixture with cadmium, sodium oxide, and potassium, when present, together with carbon dioxide and water vapor. The output from chamber 24 is fed through a cooling chamber which can be cooled with coolant circulating in an outer shell. The product in the cooling chamber is cooled to at least about 1200 degrees Fahrenheit to produce a liquid mixture of lead and cadmium. This mixture can be fed to pig molds and the pigs when solidifed can be safely handled as a non-toxic substance. A gaseous residue is recovered from the cooling chamber and will essentially include nitrogen, water vapor, carbon dioxide, carbon monoxide and hydrogen which can be safely removed from the system.

Although the invention has been shown in connection with a certain specific embodiment, it will be readily apparent to those skilled in the art that various changes in form and arrangement may be made to suit requirements without departing from the spirit and scope of the invention.

I claim as my invention:

1. A process for removing lead oxide which forms a leachable contaminant from zinc oxide in recovered waste dust, the process including the steps of,
   heating the waste dust in an oxidizing atmosphere to a temperature which is sufficient to form lead oxide vapors,
   separating said lead oxide vapors from the the fluid or sinter mass in the oxidizing atmosphere which mass includes zinc oxide,
   solidifying the lead oxide vapors, and
   recovering the solidifed lead oxide vapors.

2. The process according to claim 1 including the further step of pelletizing the recovered waste dust and thereafter said step of heating the waste dust includes heating the pelletized waste dust to a temperature of at least 2700 degrees Fahrenheit.

3. The process according to claim 1 wherein the waste dust is heated to a temperature of between 2700 degrees Fahrenheit and 2800 degrees Fahrenheit.

4. The process according to claim 1 wherein said waste dust includes cadmium oxide and wherein said step of heating the waste dust includes forming vapors of cadmium.

5. The process according to claim 1 wherein said waste dust includes sodium oxide and wherein said step of heating the waste dust includes forming vapors of sodium oxide.

6. The process according to claim 1 wherein said waste dust includes potassium oxide and wherein said step of heating the waste dust includes forming vapors of potassium.

7. The process according to claim 1 wherein said dust comprises collected particulate from an electric arc steel-making furnace.

8. The process according to claim 2 wherein said step of pelletizing the waste dust includes forming an aqueous dust mixture, forming pellets and drying the pellets to impart sufficient strength for handling the pellets.

9. The process according to claim 8 wherein said step of heating the pelletized waste dust includes feeding said dried pellets in a furnace and feeding atmospheric air in the furnace to maintain said oxidizing atmosphere therein.

10. The process according to claim 8 wherein said step of heating the pelletized waste dust includes feeding said dried pellets in a furnace and feeding oxygen in the furnace to maintain said oxidizing atmosphere therein.

11. The process according to claim 8 wherein said step of heating the pelletized waste dust includes feeding said dried pellets in a furance and feeding oxygen and atmospheric air in the furnace to maintain said oxidizing atmosphere therein.

12. The process according to claim 1 wherein said step of separating said vapors includes conducting flue gases from a chamber containing said oxidizing atmosphere, said step of causing said vapors to solidify including cooling said flue gases, and said step of recovering the solidified vapors including filtering the cooled flue gases to recover the solidifed vapors.

13. The process according to claim 1 including the further step of feeding said recovered solidified lead oxide vapors into a reducing chamber having a reducing atmosphere therein, heating the reducing chamber to a temperature sufficient to reduce lead oxide to lead.

14. The process according to claim 1 including the further steps of heating the oxidized fluid or sinter mass in a reducing atmosphere to a temperature sufficient to reduce zinc oxide and form zinc vapors, separating said zinc vapors from the reduced residual mass, recovering solidified zinc vapors, and recovering the reduced residual mass mainly comprising iron oxide.

15. The process according to claim 14 wherein the oxidized residual mass is heated to a temperature of at least 1800 degrees Fahrenheit.

16. The process according to claim 14 wherein the oxidized fluid or sinter mass is recovered from said oxidizing atmosphere and wherein said step of heating the oxidized fluid or sinter mass includes heating such mass to a temperature of between 1800 degrees Fahrenheit and 2000 degrees Fahrenheit.

17. The process according to claim 14 wherein said step of heating the oxidized fluid or sinter mass including introducing the oxidized mass in a furance chamber in the presence of a reducing gas selected from the group consisting of carbon monoxide and hydrogen.

18. The process according to claim 17 wherein carbonious material is added to said oxidized fluid or sinter mass in said reducing chamber.

19. The process according to claim 17 wherein said step of separating zinc vapors includes conducting gases of from said reducing chamber and wherein said step of recovering solidified zinc vapors includes cooling said gases.

20. The process according to claim 19 wherein the gases from said reducing chamber are cooled by the introduction of an inert gas.

21. The process according to claim 20 wherein said inert gas is selected from the group consisting of nitrogen and argon gas.

22. The process according to claim 14 including the further step of quenching the oxidized fluid or sinter mass recovered from said oxidizing chamber.

* * * * *